United States Patent
Tsubata et al.

(10) Patent No.: US 8,248,757 B2
(45) Date of Patent: Aug. 21, 2012

(54) NONAQUEOUS LITHIUM-TYPE STORAGE ELEMENT

(75) Inventors: Toshio Tsubata, Tokyo (JP); Michiko Shimoyamada, Tokyo (JP); Akihiro Mabuchi, Osaka (JP)

(73) Assignee: Asahi Kasei Kabushiki Kaisha, Osaka-Shi, Osaka (JP)

( * ) Notice: Subject to any disclaimer, the term of this patent is extended or adjusted under 35 U.S.C. 154(b) by 50 days.

(21) Appl. No.: 12/742,700

(22) PCT Filed: Nov. 14, 2008

(86) PCT No.: PCT/JP2008/070742
§ 371 (c)(1),
(2), (4) Date: May 13, 2010

(87) PCT Pub. No.: WO2009/063966
PCT Pub. Date: May 22, 2009

(65) Prior Publication Data
US 2010/0255377 A1 Oct. 7, 2010

(30) Foreign Application Priority Data
Nov. 16, 2007 (JP) .................. 2007-297741

(51) Int. Cl.
*H01G 9/00* (2006.01)
(52) U.S. Cl. ........................ 361/502; 361/501
(58) Field of Classification Search ............ 429/231.8
See application file for complete search history.

(56) References Cited

U.S. PATENT DOCUMENTS

| | | | |
|---|---|---|---|
| 6,064,560 A | 5/2000 | Hirahara et al. | |
| 2005/0207962 A1* | 9/2005 | Dietz et al. | 423/445 R |

FOREIGN PATENT DOCUMENTS

| | | |
|---|---|---|
| JP | 60-182670 A | 9/1985 |
| JP | 8-107048 A | 4/1996 |
| JP | 9-328308 A | 12/1997 |
| JP | 10-27733 A | 1/1998 |
| JP | 11-121285 A | 4/1999 |
| JP | 11-297578 A | 10/1999 |
| JP | 2000-124081 A | 4/2000 |
| JP | 2003-346801 A | 12/2003 |
| JP | 2004-221523 A | 8/2004 |
| JP | 2005-93778 A | 4/2005 |
| JP | 2006-286923 A | 10/2006 |
| JP | 2006-310412 A | 11/2006 |

OTHER PUBLICATIONS

Extended European Search Report issued Nov. 28, 2011, in European Patent Application No. 08850111.9.

* cited by examiner

*Primary Examiner* — Barbara Gilliam
*Assistant Examiner* — Gary Harris
(74) *Attorney, Agent, or Firm* — Birch, Stewart, Kolasch & Birch, LLP

(57) ABSTRACT

This invention provides a nonaqueous lithium-type storage element using an activated carbon having a specific porous structure in a positive electrode. A storage element using a conventional carbonaceous material in a positive electrode has a problem that, although the capacitance is large, the output characteristics are disadvantageously unsatisfactory. The nonaqueous lithium-type storage element using a material, which can occlude and release lithium ions in a negative electrode, can improve output characteristics while maintaining the energy density of the storage element at a substantially equal value by using, in a positive electrode, an activated carbon, satisfying $0.3 < V_1 \leq 0.8$ and $0.5 \leq V_2 \leq 1.0$ wherein $V_1$ represents the amount of mesopores derived from pores having a diameter of not less than 20 Å and not more than 500 Å, cc/g; and $V_2$ represents the amount of micropores derived from pores having a diameter of less than 20 Å, cc/g.

4 Claims, 1 Drawing Sheet

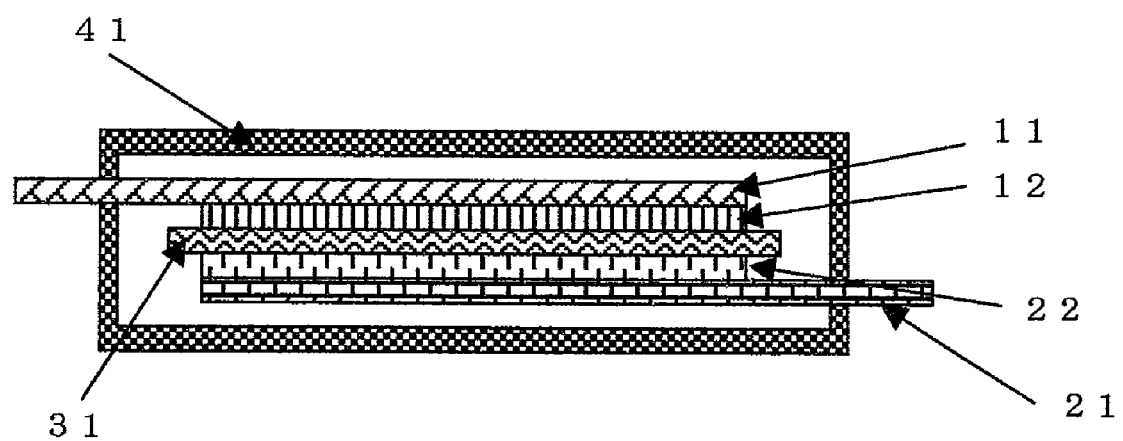

NONAQUEOUS LITHIUM-TYPE STORAGE ELEMENT

TECHNICAL FIELD

The present invention relates to a nonaqueous lithium-type storage element that offers both a high energy density and high power.

BACKGROUND ART

In recent years, in connection with preservation of global environment and effective utilization of energy intended for resource saving, much attention has been paid to midnight power storage systems, household distributive power storage systems based on photovoltaic technologies, and power storage systems for electric cars.

A first requirement for these power storage systems is that cells used have a high energy density. Vigorous effort has been made to develop lithium ion cells, which are a major candidate for high energy-density cells that meet the first requirement.

A second requirement is that output characteristics are excellent. For example, in a combination of a high-efficiency engine and a power storage system (for example, a hybrid electric car) or a fuel cell and a power storage system (for example, a fuel-cell electric car), the high-power discharge characteristics of the power storage system are required during acceleration.

Electric double-layer capacitors (hereinafter also simply referred to as "capacitors") that use activated carbon for electrodes have been developed as high-power storage devices. These electric double-layer capacitors have high durability (cycle characteristics and high-temperature storage characteristics) and output characteristics corresponding to about 0.5 kW/L to about 1 kW/L. The electric double-layer capacitor has been considered to be the optimum device for the field in which the above-described high power is required. However, the electric double-layer capacitor has an energy density of only about 1 Wh/L to about 5 Wh/L. Thus, the output duration of the electric double-layer capacitor hinders this capacitor from being put to practical use.

On the other hand, nickel hydrogen cells, currently adopted for hybrid electric cars, offer high power equivalent to that provided by the electric double-layer capacitor and has an energy density of about 160 Wh/L. However, vigorous work is proceeding to further improve the energy density and output power of the nickel hydrogen cell and to make the nickel hydrogen cell more stable at high temperature to improve the durability thereof.

Furthermore, work is proceeding to improve the output power of lithium ion cells. For example, a lithium ion cell has been developed which offers a high power of higher than 3 kW/L at a depth of discharge (a value indicating the percentage of the discharge capacitance of the device at which the device has discharged) of 50%. However, this lithium ion cell has an energy density of 100 Wh/L or less and is designed so as to intentionally hinder the high energy density which is the greatest characteristic of lithium ion cells. Furthermore, the durability (cycle characteristics and high-temperature storage characteristics) of the lithium ion cell is inferior to that of the electric double-layer capacitor. Thus, to allow the lithium ion cell to offer practical durability, the depth of discharge of the lithium ion cell needs to be limited to within the range from 0% to 100%. This further reduces the actually available capacitance, and thus vigorous effort is being made to further improve the durability.

As described above, practical application of storage elements offering high power, a high energy density, and high durability have been demanded. At present, many attempts are being made to develop storage elements called lithium ion capacitors and expected to meet these technical requirements.

The energy density of the capacitor is proportional to the capacitance and withstand voltage thereof. The electric double-layer capacitor has a withstand voltage of about 2 V to about 3 V. Attempts have been made to improve the withstand voltage by using a nonaqueous electrolytic solution containing lithium salt. For example, a capacitor has been proposed which uses activated carbon for a positive electrode and a negative electrode and which also uses a nonaqueous electrolytic solution containing lithium salt (see Patent Documents 1, 2, and 3). However, in this case, the activated carbon in the negative electrode exhibits a low charging and discharging efficiency for lithium ions. Thus, this capacitor has a cycle characteristic problem to be solved. Furthermore, attempts have been made to develop a capacitor in which activated carbon is used for the positive electrode and in which a carbonaceous material such as graphite is used for the negative electrode (see Patent Documents 4, 5, and 6). However, in this case, the graphite in the negative electrode exhibits improper I/O characteristics, and thus when cycle tests are carried out, lithium dendrites are likely to be generated. Hence, this capacitor also has a cycle characteristic problem to be solved.

Moreover, a storage element has been proposed which includes a positive electrode composed of a hydrocarbon material that is a carbonaceous material having a hydrogen/carbon atomic ratio of 0.05 to 0.5 and a porous structure with a BET specific surface area of 300 $m^2/g$ to 2,000 $m^2/g$, a BJH mesopore volume of 0.02 ml/g to 0.3 ml/g, and an MP total pore volume of 0.3 ml/g to 1.0 ml/g (see Patent Document 7). The present inventors have carried out additional tests to find that this storage element has a large electrostatic capacitance but disadvantageously offers insufficient output characteristics.

On the other hand, a negative electrode material for storage elements has been proposed in which when a carbonaceous material is attached to the surface of activated carbon as a negative electrode material that stores and emits lithium ions and when a mesopore volume relating to pores with a diameter of 20 angstrom or more and 500 angstrom or less is defined as Vm1 (cc/g) and a micropore volume relating to pores with a diameter of less than 20 angstrom is defined as Vm2 (cc/g), $0.01 \leq Vm1 \leq 0.20$ and $0.01 \leq Vm2 \leq 0.40$ (see Patent Document 8). This negative electrode material exhibits a high charging and discharging efficiency for lithium ions and is thus excellent in output characteristics.

Patent Document 1: JP 11-121285 A
Patent Document 2: JP 11-297578 A
Patent Document 3: JP 2000-124081 A
Patent Document 4: JP 60-182670 A
Patent Document 5: JP 08-107048 A
Patent Document 6: JP 10-027733 A
Patent Document 7: JP 2005-93778 A
Patent Document 8: JP 2003-346801 A

DISCLOSURE OF THE INVENTION

Problems to be Solved by the Invention

An object of the present invention is to provide a storage element that maintains a high capacitance while offering a high output density.

Means for Solving the Problems

In order to improve the output performance of the storage element disclosed in Patent Document 8 described above, the present inventors examined a wide variety of positive electrode active materials including the activated carbon described in Patent Document 7 and having the porous structure. The present inventors have thus found that when activated carbon with a particular porous structure is used for a positive electrode, the output characteristics can be significantly improved with the energy density of the storage element kept almost the same.

That is, the present invention provides the following nonaqueous lithium-type storage element.

1. A nonaqueous lithium-type storage element using a material that stores and emits a lithium ion, as a negative electrode active material, characterized in that in activated carbon used as a positive electrode active material for the element, when a mesopore volume relating to a pore with a diameter of 20 angstrom or more and 500 angstrom or less is defined as V1 (cc/g) and a micropore volume relating to a pore with a diameter of less than 20 angstrom is defined as V2 (cc/g), V1 and V2 satisfy the following ranges:

$0.3<V1 \leq 0.8$ and $0.5 \leq V2 \leq 1.0$.

2. The nonaqueous lithium-type storage element according to the above 1 described above, characterized in that in the activated carbon used as the positive electrode active material, when the mesopore volume relating to the pore with a diameter of 20 angstrom or more and 500 angstrom or less is defined as V1 (cc/g) and the micropore volume relating to the pore with a diameter of less than 20 angstrom is defined as V2 (cc/g), V1/V2 satisfies the following range:

$0.3 \leq V1/V2 \leq 0.9$.

3. The nonaqueous lithium-type storage element according to the above 1 or 2 described above, characterized in that the activated carbon used as the positive electrode active material has an average pore size of 17 angstrom or more and 25 angstrom or less.

4. The nonaqueous lithium-type storage element according to any one of the above 1 to 3 described above, characterized in that the activated carbon used as the positive electrode active material has a BET specific surface area of 1,500 $m^2/g$ or more and 3,000 $m^2/g$ or less.

5. The nonaqueous lithium-type storage element according to any one of the above 1 to 4 described above, characterized in that the material which is used as the negative electrode active material and which stores and emits the lithium ion is a carbonaceous material, and in the carbonaceous material, when a mesopore volume relating to a pore with a diameter of 20 angstrom or more and 500 angstrom or less is defined as Vm1 (cc/g) and a micropore volume relating to a pore with a diameter of less than 20 angstrom is defined as Vm2 (cc/g), Vm1 and Vm2 satisfy the following ranges:

$0.01 \leq Vm1 \leq 0.20$ and $0.01 \leq Vm2 \leq 0.40$.

Advantage of the Invention

The nonaqueous lithium-type storage element according to the present invention has the advantage of maintaining a high capacitance while offering a higher output density than the conventional cells or capacitors.

BRIEF DESCRIPTION OF THE DRAWINGS

FIG. 1 is a diagram showing a cross section of a storage element according to the present invention.

DESCRIPTION OF REFERENCE NUMERALS

11 Positive electrode power collector
12 Positive electrode active material layer
31 Separator
21 Negative electrode power collector
22 Negative electrode active material layer
41 Case

BEST MODE FOR CARRYING OUT THE INVENTION

Embodiments of the present invention will be described below in detail.

An positive electrode active material used for a storage element according to the present invention is activated carbon with pores. The positive electrode active material is characterized in that when a mesopore volume relating to pores with a diameter of 20 angstrom or more and 500 angstrom or less is defined as V1 (cc/g) and a micropore volume relating to pores with a diameter of less than 20 angstrom is defined as V2 (cc/g), $0.3<V1 \leq 0.8$ and $0.5 \leq V2 \leq 1.0$ are satisfied according to a first aspect of the present invention. A second aspect of the present invention is characterized by the requirement in the first aspect and further in that $0.3 \leq V1/V2 \leq 0.9$ are satisfied. A third aspect of the present invention is characterized by the requirement in the first or second aspect and further in that the activated carbon has an average pore size of 17 angstrom or more and 25 angstrom or less. A fourth aspect of the present invention is characterized by the requirement in any of the first to third aspects and further in that the activated carbon has a BET specific surface area of 1,500 $m^2/g$ or more and 2,500 $m^2/g$ or less.

A carbonaceous material used as a material for the activated carbon is not particularly limited provided that the material is a carbon source normally used as an activated carbon material. The carbonaceous material includes, for example, plant materials such as wood, wood powder, palm shells, byproducts of pulp manufacturing, bagasse, and blackstrap molasses; fossil materials such as peat, lignite, brown coal, bituminuous coal, anthracite, petroleum vinasse components, petroleum pitch, coke, or coal tar; various synthetic resins such as a phenol resin, a vinyl chloride resin, a vinyl acetate resin, a melamine resin, a urea resin, a resorcinol resin, celluloid, an epoxy resin, a polyurethane resin, a polyester resin, and a polyamide resin; synthetic rubber such as polybutylene, polybutadiene, and polychloroprene; synthetic wood, synthetic pulp, and the like, or carbonized products thereof. Among these materials, the plant material such as palm shells or wood powder or the carbonized product thereof is preferable, and palm shell carbon is particularly preferable.

As a carbonization and activation scheme for forming these materials into the above-described activated carbon, any known method, for example, a fixed bed scheme, a moving bed scheme, a fluidized bed scheme, a slurry scheme, or a rotary kiln scheme may be adopted.

A method for carbonizing any of the above-described materials uses inert gas such as nitrogen, carbon dioxide, helium, argon, xenon, neon, carbon monoxide, or combustion exhaust gas, or mixed gas composed of the inert gas as a main component and another gas, to burn the material at about 400° C. to 700° C. (particularly 450° C. to 600° C.) for about 30 minutes to 10 hours.

A method for activating the carbonized product obtained by the above-described carbonization method includes a gas activation method of using activation gas such as steam, carbon dioxide, or oxygen to burn the material. As an activation gas, steam or carbon dioxide is preferable.

In this activation method, the material is activated by raising the temperature thereof up to 800° C. to 1,000° C. in 3 to 12 hours (preferably in 5 to 11 hours and more preferably in 6 to 10 hours) with activation gas supplied at 0.5 kg/h to 3.0 kg/h (particularly 0.7 kg/h to 2.0 kg/h).

Moreover, before the above-described activation treatment for the carbonized product, the carbonized product may have been primarily activated. In the primary activation, the carbonaceous material may be activated by being burned at lower than 900° C. using the activation gas such as steam, carbon dioxide, or oxygen.

The activated carbon according to the present invention characterized as described below can be manufactured by appropriately combining the burning temperature/time in the above-described carbonization method with the activation gas supply amount/temperature increase speed/maximum activation temperature in the above-described activation method.

The activated carbon thus obtained is preferably characterized as follows according to the present invention.

That is, in the activated carbon, when a mesopore volume relating to pores with a diameter of 20 angstrom or more and 500 angstrom or less is defined as V1 (cc/g) and a micropore volume relating to pores with a diameter of less than 20 angstrom is defined as V2 (cc/g), preferable ranges are $0.3 < V1 \leq 0.8$ and $0.5 \leq V2 \leq 1.0$. As shown in the embodiment described below, the mesopore volume V1 and the micropore volume V2 can be increased in the above-described activation method by increasing the amount of temperature increase time until the maximum activation temperature is reached.

To improve the output characteristics offered by the activated carbon incorporated into the element, the mesopore volume V1 preferably has a value larger than 0.3 g/cc and is preferably set to 0.8 or less in order to inhibit a decrease in the capacitance of the element. Furthermore, the mesopore volume V1 is more preferably 0.35 g/cc or more and 0.7 g/cc or less and much more preferably more than 0.4 g/cc and 0.6 g/cc or less.

On the other hand, to increase the specific surface area of the activated carbon as well as the capacitance, the micropore volume V2 is preferably 0.5 g/cc or more. Furthermore, to reduce the volume of the activated carbon, while increasing the density of electrodes and the capacitance per unit volume, the micropore volume V2 is preferably 1.0 g/cc or less. Furthermore, the micropore volume V2 is more preferably 0.6 g/cc or more and 1.0 g/cc or less and much more preferably 0.8 g/cc or more and 1.0 g/cc or less. Additionally, the mesopore volume V1 and the micropore volume V2 are preferably within the range of $0.3 \leq V1/V2 \leq 0.9$. That is, to set the mesopore volume larger than the micropore volume and to inhibit possible degradation of the output characteristics with the appropriate capacitance obtained, V1/V2 is preferably 0.3 or more. Furthermore, to set the micropore volume larger than the mesopore volume and to inhibit a decrease in capacitance with the appropriate output characteristics obtained, V1/V2 is preferably 0.9 or less. Additionally, a more preferable range is $0.4 \leq V1/V2 \leq 0.7$, and a much more preferable range is $0.55 \leq V1/V2 \leq 0.7$.

Furthermore, the average pore size of the activated carbon used in the present invention is preferably 17 angstrom or more, more preferably 18 angstrom or more, and most preferably 20 angstrom or more in order to maximize the output. Additionally, the average pore size is preferably set to 25 angstrom or less in order to maximize the capacitance. The average pore size as used herein refers to a value obtained by dividing the total pore volume per weight obtained by measuring the equilibrium absorption amount of nitrogen gas under each relative pressure at a liquid nitrogen temperature, by the BET specific surface area.

Moreover, the BET specific surface area of the activated carbon used in the present invention is preferably 1,500 $m^2/g$ or more and 3,000 $m^2/g$ or less and more preferably 1,500 $m^2/g$ or more and 2,500 $m^2/g$ or less.

The negative electrode active material used for the storage element according to the present invention may be a material that stores and emits lithium ions, such as a carbonaceous material, lithium-titanium composite oxide, or a conductive polymer. A preferable negative electrode active material is a carbonaceous material such as non-graphitable carbon, graphitable carbon, or a composite porous material disclosed in Patent Document 8. Furthermore, a much more preferable carbonaceous material is a composite porous material with a carbonaceous material attached to the surface of the activated carbon in which when a mesopore volume relating to pores with a diameter of 20 angstrom or more and 500 angstrom or less is defined as Vm1 (cc/g) and a micropore volume relating to pores with a diameter of less than 20 angstrom is defined as Vm2 (cc/g), preferable ranges are $0.01 \leq Vm1 \leq 0.20$ and $0.01 \leq Vm2 \leq 0.40$. Such a carbonaceous material can be manufactured by the following method disclosed in Patent Document 8. That is, the carbonaceous material can be obtained by thermally treating the activated carbon and a carbonaceous material precursor in a coexisting condition.

Here, for the activated carbon used as a material, for example, a raw material to be formed into the activated carbon is not particularly limited as long as the resultant composite porous material exhibits desired characteristics. Commercially available activated carbon may be used which is obtained from any of various raw materials containing petroleum, coal, a plant, a polymer, or the like. Activated carbon powder with an average particle size of about 1 μm to 500 μm (more preferably 1 μm to 50 μm) is preferably used.

Furthermore, the carbonaceous material precursor is an organic material which, when thermally treated, allows the carbonaceous material to be attached to the activated carbon and which is soluble in a liquid or a solvent. The carbonaceous material precursor may be, for example, pitch, mesocarbon microbeads, coke, or a synthetic resin such as a phenol resin. The use of the pitch, which is more inexpensive than the other carbonaceous material precursors, is preferable in terms of manufacturing costs. The pitch is roughly classified into petroleum pitch and coal pitch. Examples of the petroleum pitch include vinasse of crude oil, fluid catalytic cracking residues (decant oil or the like), bottom oil from a thermal cracker, and ethylene tar resulting from naphtha cracking.

If the above-described pitch is used, the composite porous material is obtained by allowing a volatile component or a pyrolytic component of the pitch to react thermally on the surface of the activated carbon to attach the carbonaceous material to the activated carbon. In this case, at about 200° C. to about 500° C., the attachment of the volatile or pyrolytic component of the pitch into the pores in the activated carbon progresses. At 400° C. or higher, reaction in which the attached component changes to a carbonaceous material progresses. The peak temperature during the thermal treatment is appropriately determined based on the characteristics of the composite porous material obtained, a thermal reaction pattern, a thermal reaction atmosphere, and the like. The peak temperature is preferably 400° C. or higher, more preferably between 450° C. and 1,000° C., and particularly preferably between about 500° C. and about 800° C. Furthermore, the time for which the peak temperature is maintained during the thermal treatment may be between 30 minutes and 10 hours, preferably between 1 hour and 7 hours, and more preferably between 2 hours and 5 hours. If the thermal treatment is performed at a peak temperature of between 500° C. and 800° C. for between 2 hours and 5 hours, the carbonaceous material attached to the surface of the activated carbon is expected to change to polycyclic aromatic hydrocarbon.

In the present invention, the micropore volume and the mesopore volume have values determined by the following method. That is, a sample is dried in a vacuum at 500° C. for a full day. An adsorption isotherm and a desorption isotherm are measured using nitrogen as an adsorbate. Then, the desorption isotherm is used to calculate the micropore volume by an MP method and to calculate the mesopore volume by a BJH method. The MP method means a method of determining the micropore volume, the micropore area, and the distribution of micropores utilizing a "t-plot method" (B. C. Lippens, J. H. de Boer, J. Catalysis, 4319 (1965)); the MP method was invented by M. Mikhail, Brunauer, and Bodor (R. S. Mikhail, S. Brunauer, E. E. Bodor, J. Colloid Interface Sci., 26, 45 (1968)). Furthermore, the BJH method is a calculation method generally used to analyze mesopores and proposed by BarrEtt, Joyner, and Halenda (E. P. Barrett, L. G. Joyner, and P. Halenda, J. Amer. Chem. Soc., 73, 373 (1951)).

The positive electrode active material and the negative electrode active material are molded into electrodes by a well-known technique. The electrodes can then be used as a constituent material for a nonaqueous lithium-type storage element including a combination of a nonaqueous electrolytic solution containing lithium salt and a positive electrode composed of activated carbon.

The technique for molding the active materials into electrodes may be a well known technique for manufacturing electrodes for lithium ion cells, capacitors, or the like. For example, electrodes are obtained by using a solution of an organic solvent of resin which solution serves as a binding agent, to coat an active material layer on metal serving as a power collector, then drying the solution, and pressing the resultant structure as required. Furthermore, the active material layer may contain not only the active material but also particulate graphite, acetylene black, Ketchen Black, vapor-grown carbon fiber, or the like as required.

The molded positive and negative electrodes are laminated or laminated in a winding manner via a separator and inserted in a can or a case formed of a laminate film. The separator may be a polyethylene microporous film used for lithium ion secondary cells, a polypropylene microporous film, or cellulose nonwoven paper used for electric double-layer capacitors. The thickness of the separator is preferably set to 10 μm or more in order to reduce self-discharge resulting from a micro-short circuit. The thickness of the separator is also preferably set to 50 μm or less in order to maximize the energy density of the storage element, while inhibiting the output characteristics from being degraded.

The solvent for the nonaqueous electrolytic solution used for the storage element according to the present invention may be cyclic ester carbonate typified by ethylene carbonate (EC) and propylene carbonate (PC), chain ester carbonate typified by diethyl carbonate (DEC), dimethyl carbonate (DMC), and ethylmethyl carbonate (MEC), lactones such as γ-butyrolactone (γBL), or a mixture of any of these solvents.

The electrolyte dissolved into these solvents needs to be lithium salt. Examples of preferred lithium salt include $LiBF_4$, $LiPF_6$, $LiN(SO_2C_2F_5)_2$, $LiN(SO_2CF_3)$ $(SO_2C_2F_5)$, $LiN(SO_2CF_3)$ $(SO_2C_2F_4H)$, and a mixture of any of these salts. The concentration of the electrolyte in the nonaqueous electrolytic solution is preferably set to 0.5 mol/L or more in order to inhibit a decrease in the capacitance of element due to lack of anions. Furthermore, the concentration is preferably set to 2.0 mol/L or less in order to prevent a possible situation in which unsolved salt precipitates in the electrolytic solution or the electrolytic solution becomes excessively viscous, to reduce conductivity, thus degrading the output characteristics.

Lithium may be pre-doped into the negative electrode used for the nonaqueous lithium-type storage element according to the present invention. The doped lithium enables the capacitance and operating voltage of the element to be controlled.

EXAMPLES

Examples and comparative examples are shown below to further clarify the characteristics of the present invention.

Example 1

Carbonized products of crushed palm shell were carbonized in a small carbonization furnace at 500° C. in the presence of nitrogen. Thereafter, instead of nitrogen, 1 kg/h of steam heated in a preheating furnace was fed into the carbonization furnace. The temperature in the furnace was increased to 900° C. over 8 hours. Then, the carbonized products were taken out and cooled in a nitrogen atmosphere to obtain activated carbon. The activated carbon obtained was washed in water for 10 hours and then drained. Thereafter, the activated carbon was dried in an electric dryer maintained at 115° C., for 10 hours. The activated carbon was then crushed in a ball mill for 1 hour to obtain activated carbon serving as a positive electrode material.

The distribution of pores in the present activated carbon was measured using a pore distribution measuring instrument (AUTOSORB-1 AS-1-MP) manufactured by Yuasa Ionics Inc. As a result, the activated carbon was found to have a BET specific surface area of 2,360 $m^2$/g, a mesopore volume (V1) of 0.52 cc/g, a micropore volume (V2) of 0.88 cc/g, a V1/V2 of 0.59, and an average pore size of 22.9 angstrom. The activated carbon was used as a positive electrode material to mix 83.4 parts by weight of activated carbon, 8.3 parts by weight of acetylene black, 8.3 parts by weight of PVDF (polyvinylidene fluoride), and NMP(N-methylpyrrolidone). Slurry was thus obtained. Then, the slurry obtained was applied to one surface of aluminum foil of thickness 15 μm, dried, and pressed. A positive electrode of thickness 60 μm was obtained.

Carbonized products of crushed palm shell were carbonized in the small carbonization furnace at 500° C. in the presence of nitrogen. Thereafter, instead of nitrogen, 2 kg/h of steam heated in the preheating furnace was fed into the carbonization furnace. The temperature in the furnace was increased to 900° C. over 4 hours. Then, the carbonized products were taken out and cooled in a nitrogen atmosphere to obtain activated carbon. The activated carbon obtained was washed in water for 10 hours and then drained. Thereafter, the activated carbon was dried in the electric dryer maintained at 115° C., for 10 hours. The activated carbon was then crushed in the ball mill for 1 hour to obtain activated carbon.

The distribution of pores in the activated carbon was measured using the pore distribution measuring instrument (AUTOSORB-1 AS-1-MP) manufactured by Yuasa Ionics Inc. As a result, the activated carbon was found to have a BET specific surface area of 1,620 m$^2$/g, a mesopore volume (V1) of 0.18 cc/g, a micropore volume (V2) of 0.67 cc/g, a V1/V2 of 0.27, and an average pore size of 20.7 angstrom. 150 g of the activated carbon was placed in a stainless steel mesh basket, which was then loaded on a stainless vat with 300 g of petroleum pitch (softening point: 80° C.) placed therein. The vat was then installed in an electric furnace (in-furnace effective size: 300 mm×300 mm×300 mm), where thermal reaction took place. Thermal treatment was performed as follows. In a nitrogen atmosphere, the temperature in the furnace was increased to 670° C. in 4 hours and then maintained at 670° C. for 4 hours. Subsequently, the temperature was reduced down to 60° C. through natural cooling. The activated carbon was then taken out from the furnace.

The product obtained (hereinafter referred to as the "present composite porous material") had a BET specific surface area of 255 m$^2$/g and a weight of 236.6 g. This indicates that the weight of the raw material activated carbon increased by a value corresponding to 57.7% of thereof. Thus, the composition ratio was calculated to be 0.577. Furthermore, the present composite porous material had a mesopore volume (Vm1) of 0.0656 cc/g and a micropore volume (Vm2) of 0.107 cc/g.

Then, 83.4 parts by weight of the present composite porous material obtained was mixed with 8.3 parts by weight of acetylene black, 8.3 parts by weight of PVDF (polyvinylidene fluoride), and NMP(N-methylpyrrolidone) to obtain a slurry. The slurry obtained was then applied to one surface of aluminum foil of thickness 14 μm, dried, and pressed. A negative electrode of thickness 40 μm was obtained.

A nonaqueous lithium-type storage element was assembled as follows. Each of the positive and negative electrodes obtained was cut so as to have an area of 2 cm$^2$. The active material surfaces of the positive and negative electrodes were located opposite each other across a separator made of a nonwoven cloth of thickness 30 μm. The electrodes were then sealed into a container made from a laminate sheet composed of polypropylene and aluminum. In this case, lithium metal was used to electrochemically pre-dope lithium ions equivalent to 700 mAh/g per material weight, into the negative electrode. The electrolytic solution used was obtained by mixing ethylene carbonate and diethyl carbonate in a weight ratio of 3:7 to obtain a solvent and then dissolving LiPF$_6$ into the solvent so that the concentration of LiPF$_6$ in the solvent was 1 mol/L.

A charging and discharging apparatus (ACD-01) manufactured by ASKA ELECTRONIC CO., LTD. was used to perform constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.42 mAh. Then, the storage element was similarly charged, and a constant current of 250 mA was discharged from the storage element down to 2.0 V. Then, a capacitance of 0.27 mAh was obtained. That is, the ratio of the discharge capacitance at 250 mA to the discharge capacitance at 1 mA was 0.64.

Comparative Example 1

A nonaqueous lithium-type storage element was produced by a method similar to that in Example 1 except that the activated carbon for a positive electrode (a BET specific surface area of 1,620 m$^2$/g, a mesopore volume (V1) of 0.18 cc/g, a micropore volume (V2) of 0.67 cc/g, a V1/V2 of 0.27, and an average pore size of 20.7 angstrom) used as the raw material of the present composite porous material described in Example 1 was used directly as a positive electrode active material.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.39 mAh. Then, the storage element was similarly charged, and a constant current of 250 mA was discharged from the storage element down to 2.0 V. Then, a capacitance of 0.17 mAh was obtained. That is, the ratio of the discharge capacitance at 250 mA to the discharge capacitance at 1 mA was 0.44.

Example 2

Carbonized products of crushed palm shell were carbonized in the small carbonization furnace at 500° C. in the presence of nitrogen. Thereafter, instead of nitrogen, 1 kg/h of steam heated in the preheating furnace was fed into the carbonization furnace. The temperature in the furnace was increased to 900° C. over 10 hours. Then, the carbonized products were taken out and cooled in a nitrogen atmosphere to obtain activated carbon. The activated carbon obtained was washed in water for 10 hours and then drained. Thereafter, the activated carbon was dried in the electric dryer maintained at 115° C., for 10 hours. The activated carbon was then crushed in the ball mill for 1 hour to obtain activated carbon serving as a positive electrode material.

The distribution of pores in the present activated carbon was measured using the pore distribution measuring instrument (AUTOSORB-1 AS-1-MP) manufactured by Yuasa Ionics Inc. As a result, the activated carbon was found to have a BET specific surface area of 2,700 m$^2$/g, a mesopore volume (V1) of 0.63 cc/g, a micropore volume (V2) of 0.92 cc/g, a V1/V2 of 0.68, and an average pore size of 20.3 angstrom. Electrodes were produced by a method similar to that in Example 1 except that the activated carbon was used as a positive electrode active material. A nonaqueous lithium-type storage element was thus produced.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.47 mAh. Then, the storage element was similarly charged, and a constant current of 250 mA was discharged from the storage element down to 2.0 V. Then, a capacitance of 0.29 mAh was obtained. That is, the ratio of the discharge capacitance at 250 mA to the discharge capacitance at 1 mA was 0.62.

Example 3

Carbonized products of crushed palm shell were carbonized in the small carbonization furnace at 500° C. in the presence of nitrogen. Thereafter, instead of nitrogen, 1 kg/h of steam heated in the preheating furnace was fed into the carbonization furnace. The temperature in the furnace was increased to 900° C. over 6 hours. Then, the carbonized products were taken out and cooled in a nitrogen atmosphere to obtain activated carbon. The activated carbon obtained was washed in water for 10 hours and then drained. Thereafter, the activated carbon was dried in the electric dryer maintained at 115° C., for 10 hours. The activated carbon was then crushed in the ball mill for 1 hour to obtain activated carbon serving as a positive electrode material.

The distribution of pores in the present activated carbon was measured using the pore distribution measuring instrument (AUTOSORB-1 AS-1-MP) manufactured by Yuasa Ionics Inc. As a result, the activated carbon was found to have a BET specific surface area of 1,700 m$^2$/g, a mesopore volume (V1) of 0.35 cc/g, a micropore volume (V2) of 0.68 cc/g, a V1/V2 of 0.52, and an average pore size of 21.6 angstrom. Electrodes were produced by a method similar to that in Example 1 except that the activated carbon was used as a positive electrode active material. A nonaqueous lithium-type storage element was thus produced.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.40 mAh. Then, the storage element was similarly charged, and a constant current of 250 mA was discharged from the storage element down to 2.0 V. Then, a capacitance of 0.21 mAh was obtained. That is, the ratio of the discharge capacitance at 250 mA to the discharge capacitance at 1 mA was 0.53.

Example 4

Carbonized products of crushed palm shell were carbonized in the small carbonization furnace at 500° C. in the presence of nitrogen. Thereafter, instead of nitrogen, 1 kg/h of steam heated in the preheating furnace was fed into the carbonization furnace. The temperature in the furnace was increased to 900° C. over 7 hours. Then, the carbonized products were taken out and cooled in a nitrogen atmosphere to obtain activated carbon. The activated carbon obtained was washed in water for 10 hours and then drained. Thereafter, the activated carbon was dried in the electric dryer maintained at 115° C., for 10 hours. The activated carbon was then crushed in the ball mill for 1 hour to obtain activated carbon serving as a positive electrode material.

The distribution of pores in the present activated carbon was measured using the pore distribution measuring instrument (AUTOSORB-1 AS-1-MP) manufactured by Yuasa Ionics Inc. As a result, the activated carbon was found to have a BET specific surface area of 2,050 m$^2$/g, a mesopore volume (V1) of 0.46 cc/g, a micropore volume (V2) of 0.77 cc/g, a V1/V2 of 0.60, and an average pore size of 20.9 angstrom. Electrodes were produced by a method similar to that in Example 1 except that the activated carbon was used as a positive electrode active material. A nonaqueous lithium-type storage element was thus produced.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.44 mAh. Then, the storage element was similarly charged, and a constant current of 250 mA was discharged from the storage element down to 2.0 V. Then, a capacitance of 0.25 mAh was obtained. That is, the ratio of the discharge capacitance at 250 mA to the discharge capacitance at 1 mA was 0.57.

Comparative Example 2

Electrodes were produced by a method similar to that in Example 1 except that a commercially available pitch activated carbon (a BET specific surface area of 2,300 m$^2$/g, a mesopore volume (V1) of 0.11 cc/g, a micropore volume (V2) of 0.95 cc/g, a V1/V2 of 0.12, and an average pore size of 17.6 angstrom) was used as activated carbon for a positive electrode, that is, as a positive electrode active material. Thus, a nonaqueous lithium-type storage element was produced.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.48 mAh. Then, the storage element was similarly charged, and a constant current of 250 mA was discharged from the storage element down to 2.0 V. Then, a capacitance of 0.15 mAh was obtained. That is, the ratio of the discharge capacitance at 250 mA to the discharge capacitance at 1 mA was 0.32.

Comparative Example 3

Electrodes were produced by a method similar to that in Example 1 except that a commercially available pitch activated carbon (a BET specific surface area of 1,960 m$^2$/g, a mesopore volume (V1) of 0.14 cc/g, a micropore volume (V2) of 0.78 cc/g, a V1/V2 of 0.18, and an average pore size of 18.7 angstrom) was used as activated carbon for a positive electrode, that is, as a positive electrode active material. Thus, a nonaqueous lithium-type storage element was produced.

The storage element produced was subjected to constant-current and constant-voltage charging for 8 hours such that the storage element was charged with a current of 1 mA up to 4.0 V and such that a constant voltage of 4.0 V was then applied to the storage element. Subsequently, a constant current of 1 mA was discharged from the storage element down to 2.0 V. The discharge capacitance was 0.49 mAh. Then, the storage element was similarly charged, and a constant current of 250 mA was discharged from the storage element down to 20 V. Then, a capacitance of 0.22 mAh was obtained. That is, the ratio of the discharge capacitance at 250 mA to the discharge capacitance at 1 mA was 0.45.

The above-described results are summarized in Table 1. (In Table 1, the ratio of the discharge capacitances is represented by a capacitance maintenance rate (%) at 250 mA.)

TABLE 1

|  | Example 1 | Example 2 | Example 3 | Example 4 | Comparative Example 1 | Comparative Example 2 | Comparative Example 3 |
|---|---|---|---|---|---|---|---|
| Mesopore volume (V1) cc/g of activated carbon used as a positive electrode active material | 0.52 | 0.63 | 0.35 | 0.46 | 0.18 | 0.11 | 0.14 |
| Micropore volume (V2) cc/g of activated carbon used as a positive electrode active material | 0.88 | 0.92 | 0.68 | 0.77 | 0.67 | 0.95 | 0.78 |
| V1/V2 | 0.59 | 0.68 | 0.52 | 0.60 | 0.27 | 0.12 | 0.18 |
| Capacitance maintenance rate (%) at 250 mA | 64 | 62 | 53 | 57 | 44 | 32 | 45 |

INDUSTRIAL APPLICABILITY

The storage element according to the present invention is suitably applicable to the field of an automotive hybrid driving system with a combination of a storage element with an internal engine or a fuel cell and a motor and the field of assistance for an instantaneous power peak.

The invention claimed is:

1. A nonaqueous lithium-type storage element comprising:
a negative electrode active material that stores and emits a lithium ion; and
a positive electrode active material of activated carbon having a BET specific surface area of 1,500 m²/g or more and 3,000 m²/g or less, when a mesopore volume relating to a pore with a diameter of 20 angstrom or more and 500 angstrom or less and calculated by a BJH method is defined as V1 (cc/g) and a micropore volume relating to a pore with a diameter of less than 20 angstrom and calculated by an MP method is defined as V2 (cc/g), V1 and V2 satisfy the following ranges:

$0.3 < V1 \leq 0.8$, $0.5 \leq V2 \leq 1.0$, and $0.3 \leq V1/V2 \leq 0.9$.

2. The nonaqueous lithium-type storage element according to claim 1, wherein the activated carbon has an average pore size of 17 angstrom or more and 25 angstrom or less.

3. The nonaqueous lithium-type storage element according to claim 1, wherein the negative electrode active material is a carbonaceous material, and in the carbonaceous material, when the mesopore volume relating to the pore with a diameter of 20 angstrom or more and 500 angstrom or less and calculated by the BJH method is defined as Vm1 (cc/g) and the micropore volume relating to a pore with a diameter of less than 20 angstrom and calculated by the MP method is defined as Vm2 (cc/g), Vm1 and Vm2 satisfy the following ranges:

$0.01 \leq Vm1 \leq 0.20$ and $0.01 \leq Vm2 \leq 0.40$.

4. The nonaqueous lithium-type storage element according to claim 2, wherein the negative electrode active material is a carbonaceous material, and in the carbonaceous material, when the mesopore volume relating to the pore with a diameter of 20 angstrom or more and 500 angstrom or less and calculated by the BJH method is defined as Vm1 (cc/g) and the micropore volume relating to a pore with a diameter of less than 20 angstrom and calculated by the MP method is defined as Vm2 (cc/g), Vm1 and Vm2 satisfy the following ranges:

$0.01 \leq Vm1 \leq 0.20$ and $0.01 \leq Vm2 \leq 0.40$.

* * * * *